United States Patent Office 3,073,816
Patented Jan. 15, 1963

3,073,816
PROCESS OF PRODUCING 21-ORTHOPHOSPHATES OF STEROIDS AND THE 21-DIAMIDE ORTHOPHOSPHATE INTERMEDIATES THEREFOR
Klaus Irmscher and Werner Schumann, Darmstadt, Germany, assignors to E. Merck Aktiengesellschaft, Darmstadt, Germany
No Drawing. Filed Nov. 23, 1960, Ser. No. 71,154
Claims priority, application Germany Nov. 26, 1959
14 Claims. (Cl. 260—239.5)

Several processes are already known for the preparation of primary steroid-21-orthophosphates. In some of these methods, the introduction of the orthophosphate radical is achieved by reacting the 21-hydroxyl group with suitable reaction-capable functional groups, as for example, a 21-iodine atom; this processing, as a general rule, requires a plurality of steps (see Belgian Patent No. 572,780).

Processes are also known in which first of all a tertiary steroid-21-orthophosphate is prepared (an OH group of orthophosphoric acid is esterified with the steroid, both of the other OH groups are esterified with other alcoholic components). The tertiary steroid-21-orthophosphate must be further split (U.S. Patent 2,870,177). Such splitting can be effected, for example, by hydrolysis, whereby particular difficulties arise because of side reactions. If the splitting is effectuated in the form of a hydrogenation-splitting, the α-β-unsaturated system of the steroid-3-ketones is endangered, which is a structure also exhibited by the physiologically very valuable corticoid-steroids. In such cases, one is compelled to resort to detours with consequent sharp diminution in yield (U.S. Patents 2,870,177 and 2,789,117). A process is also known in which the steroid-21-iodide is converted directly to steroid-21-orthophosphate with silver-dihydrogen-phosphate. When this method is used, no ascertainable yield of the desired steroid-21-orthophosphate is obtained.

The known syntheses of steroid-21-phosphates achieved through the intermediate step of preparing a tertiary steroid-21-phosphate involves the condensation of the steroid-21-alcohol with functionally substituted secondary orthophosphoric acid esters. The active third functional group of these esters, is reacted by condensation with the steroid radical. These methods have the disadvantage that intermediate tertiary steroid-21-phosphates are obtained in which all three of the OH-groups of the orthophosphoric acid are esterified so that a further step is required to effectuate a selective splitting of these three practically equivalent ester functional groups.

It has now been found that these disadvantages can be avoided if instead of starting with a tertiary-steroid-21-orthophosphate, one uses as a starting material a steroid-21-diamido-orthophosphate of the formula:

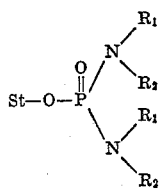

wherein $R_1$ and $R_2$ designate hydrogen or an organic radical, which latter may optionally be linked together; and St designates the steroid radical of the pregnane series having a free valence in the 21-position.

Such a steroid-21-diamido-orthophosphate can, by treatment with acidic agents, advantageously with acid ion exchangers, be transformed into the corresponding steroid-21-orthophosphate (with two free hydroxyl groups attached to the phosphorus atom) and optionally further transformed into the physiologically tolerable organic or inorganic water soluble salts. These methods have the advantage that the two functional units (amide groups) being non-equivalent to the steroid ester group can be split hydrolytically.

Such a method is known from the work of Montgomery and Turnbull (J. Chem. Soc. 1958, page 1963). Those authors have also investigated the use of that method for the preparation of cholesterol-3-orthophosphate. Upon the splitting off of the diamido groups, the entire orthophosphate radical in the three position (of the cholesteryl ester) is eliminated, so that this method did not appear to be suitable for the preparation of steroids. It was, accordingly, surprising and also unexpected to those skilled in this art that the splitting off of the diamido groups from the steroid-21-diamido-orthophosphate could be carried out with good yield, without thereby splitting off the orthophosphate radical in the 21-position.

The object of this invention is a process of preparing steroid-21-orthophosphates and the salts thereof which resides in the feature that steroids of the general formula:

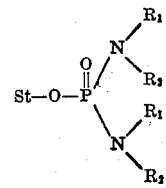

wherein $R_1$ and $R_2$ and St have the above described significance, by treatment with acid agents, advantageously with acidic ion exchangers, in the presence of a suitable solvent are converted into a steroid-21-orthophosphate of the formula

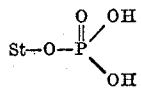

wherein St has the above significance;

and that optionally the last mentioned compounds, are converted by means or known methods into the physiologically tolerable, water soluble organic or inorganic salts.

Among the acid agents which may be used for the process in accordance with this invention, there are, for example, mineral acids or strong organic acids, as for example, sulphonic acids. The mineral acids may be used in gaseous form in the presence of a suitable inert solvent.

Among the ion exchangers there may be used all acidic ion exchangers, such as, for example, exchange resins containing sulphonic acid groups. Resins of this type are, for example, commercially available under the trademarks Amberlite IR 120, Amberlite IRC 40, Dowex 50, Permutit RS, Permutit C, Lewatit S 100, Lewatit CNO, Merck I, Merck IV and Duolite CS 101.

As solvent media for the process in accordance with the instant invention, there are basically suitable aqueous or organic media. There may be used, for example: alcohols, such as methanol, ethanol, propanol, isopropanol, or benzene, xylene, toluene, as well as dioxane, tetrahydrofuran, chloroform, carbon tetrachloride, etc. These solvents may also be used in the form of mixtures and optionally with the addition of water.

The reaction can suitably be carried out at elevated temperature. The upper limit of the reaction temperature depends upon the temperature stability of the applied ion exchanger employed. For sensitive substances, however, it is advisable to carry out the reactions at room temperature with longer reaction times.

The steroid-21-diamido-orthophosphates which are used as the starting materials for the process in accordance with the instant invention can be prepared, for instance, by reacting the initial free steroid-21-alcohols with reactants which are capable of forming dihalogeno-orthophosphates (for example, phosphorusoxychloride or pyrophosphorylchloride). The thus prepared steroid-21-dihalogeno-orthophosphates are then converted into the desired steroid-21-diamido-orthophosphates by means of the corresponding organic amines. The steroid-21-diamido-orthophosphate may also be prepared by reacting a free steroid-21-alcohol with a diamido-phosphoryl-halogen of the formula

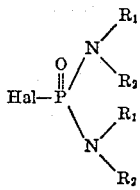

wherein $R_1$ and $R_2$ have the above significance, and Hal designates chlorine, bromine or iodine.

In lieu of such diamido-phosphoryl-halogenide there may also be used the corresponding tetra-amido-pyrophosphate of the formula

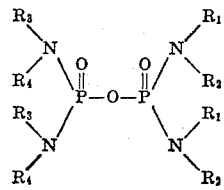

wherein $R_3$ and $R_4$ have the same meaning as $R_1$ and $R_2$ and $R_1$ and $R_2$ have the above mentioned significance.

The substituents $R_1$ and $R_2$ may be hydrogen or hydrocarbon radicals. The hydrocarbon radicals may contain one or more substituents, which, optionally, may be functional groups and/or they may contain hetero atoms. Furthermore, the substituents $R_1$ and $R_2$ may be linked together to form rings, wherein such rings may contain hetero atoms. $R_1$ and $R_2$ thus may be, for example, alkyl or aralkyl radicals such as methyl, ethyl, propyl, isobutyl or benzyl, etc., or for example, when linked together to form piperidino-, pyridino- or morpholino-radicals. $R_1$ may also be aryl when $R_2$ is hydrogen.

The starting materials used for the preparation of the steroid-21-diamido-orthophosphates may belong to steroid-21-alcohols of the pregnane series and may contain one or several functional groups in the molecule. For example, they may contain oxygen functional units in positions 3, 11, 16, 17 and 20. They may also contain double bonds in the 1-, and/or 4-, and/or 6-position There may also be used steroids which are unsaturated in the 9, 11 position; and one can therefrom prepare 21-orthophosphates wherein the 9, 11 position is occupied by an epoxy group and, from which, by treatment with hydrogen halide yielding agents they may be transformed into the corresponding 9α-halogeno-11β-hydroxy-steroid-21-orthophosphates. It will be understood, of course, that the obtained steroid-21-orthophosphates can subsequently be dehydrogenated in the 1- and/or 4- and/or 6-position or one can even finally oxidize a hydroxyl which may be present in the 11-position into an 11-keto group. The mentioned dehydrogenation can be carried out either microbiologically or chemically as, for example, by treatment with 1, 2-dehydrogenating microorganisms of the type, Corynebacterium, *Bacillus sphaericus*, *Didymella lycopersici*, Mycobacteria, etc. or by reaction with selenium dioxide or by bromination followed by dehydro-bromination (HBr— splitting off). The steroid-21-diamido-orthophosphate starting materials may also contain, already present, halogen functions in the 9-, 6-, 2-, or other positions. For such conversions there also are suitable steroid-21-diamido-orthophosphates which contain a double bond in the 6, 7 position and a halogen atom in the 6-position, whereby the mentioned compounds may optionally contain further double bonds in the 1- and 4-positions as well as additional halogen atoms in the 9α-position, and oxygen functions in the 3-, 11-, 16-, 17- and 20-position. Further there may be used as starting material such steroid-21-diamido-orthophosphates which contain in the 16-position, an alkyl- or alkylidene radical, as for example, an exocyclic methylene group. Also there may be used as a starting material such steroid-21-diamido-orthophosphates which contain an alkyl radical in the 6- and/or in the 2-position.

In accordance with the process of the invention the following steroid-21-orthophosphate of high physiological activity or the salts thereof may be prepared:

Cortisone-21-orthophosphate
Hydrocortisone-21-orthophosphate
11-epi-hydrocortisone-21-orthophosphate
9α-fluoro-cortisone-21-orthophosphate
9α-fluoro-hydrocortisone-21-orthophosphate
Prednisone-21-orthophosphate
Prednisolone-21-orthophosphate
9α-fluoro-prednisone-21-orthophosphate
9α-fluoro-prednisolone-21-orthophosphate
16-methyl-cortisone-21-orthophosphate
16-methyl-hydrocortisone-21-orthophosphate
16-methyl-9α-fluoro-cortisone-21-orthophosphate
16-methyl-9α-fluoro-hydrocortisone-21-orthophosphate
16-methyl-prednisone-21-orthophosphate
16-methyl-prednisolone-21-orthophosphate
16-methyl-9α-fluoro-prednisone-21-orthophosphate
16-methyl-9α-fluoro-prednisolone-21-orthophosphate
16-methylene-cortisone-21-orthophosphate
16-methylene-hydrocortisone-21-orthophosphate
16-methylene-9α-fluoro-cortisone-21-orthophosphate
16-methylene-9α-fluoro - hydrocortisone - 21 - orthophosphate
16-methylene-prednisone-21-orthophosphate
16-methylene-prednisolone-21-orthophosphate
16-methylene-9α-fluoro-prednisone-21-orthophosphate
16-methylene-9α-fluoro-prednisolone-21-orthophosphate
16-methylene-9α,6-difluoro-cortisone-21-orthophosphate
16-methylene-9α,6-difluoro-hydrocortisone-21 - orthophosphate
16-methylene-9α,6-difluoro-prednisone-21-orthophosphate
16-methylene-9α,6-difluoro-prednisolone - 21 - orthophosphate
16-methylene-9α,6-difluoro - 6 - dehydro - prednisone-21-orthophosphate
6-fluoro-6-dehydro-cortisone-21-orthophosphate
6-fluoro-6-dehydro-hydrocortisone-21-orthophosphate
6-fluoro-6-dehydro-prednisone-21-orthophosphate
6-fluoro-6-dehydro-prednisolone-21-orthophosphate
16-methyl-6-fluoro-6-dehydro - cortisone - 21 - orthophosphate
16-methyl-6-fluoro-6-dehydrohydrocortisone - 21 - orthophosphate
16-methyl-6-fluoro-6-dehydro-prednisone - 21 - orthophosphate
16-methyl-6-fluoro-6-dehydro - prednisolone - 21 - orthophosphate
16-methyl-6,9α-difluoro-6-dehydro - cortisone - 21 - orthophosphate
16-methyl-6,9α-difluoro-6-dehydro - hydrocortisone - 21-orthophosphate
16-methyl-6,9α-difluoro-6-dehydro-prednisone - 21 - orthophosphate
Desoxycorticosterone-21-orthophosphate
Pregnane-3,20-dione-21-ol-21-orthophosphate The conversion of the thus prepared steroid-21-orthophosphate into the corresponding physiologically tolerable water soluble salts can be accomplished in accordance with known or conventional methods, as for example, by treatment with inorganic or organic bases. For the preparation of the mono- or di-alkali metal salts, the steroid-21-orthophosphates of this invention can be reacted with alkali metal-hydroxides, alkali metal-bicarbonates or alkali metal-carbonates. By treatment with aqueous ammonia, one obtains the corresponding ammonium salts. Ammonium salts containing organic substituents may be prepared by treatment of the steroid-21-orthophosphates in accordance with this invention through the use of the corresponding amines, as for example, triethylamine, diethylamine, etc. The reaction can be carried out advantageously in the presence of a suitable solvent. The precipitated salts can be isolated from the reaction mixture in accordance with conventional or known methods, as for example, by crystallization or by partitioning between two organic or organic-inorganic phases.

The following are examples in accordance with this invention. The temperatures are given in degrees centigrade.

Example I (a) 5 g. (grams) of hydrocortisone and 3.4 g. of dimorpholido-phosphorylchloride are dissolved in 10 ccm. of absolute pyridine and allowed to stand for 5 days at room temperature. Finally the reaction mixture is poured into 200 ccm. of water, the organic material taken up in chloroform, and the chloroform solution washed with water, then with 1% hydrochloric acid and again with water. The chloroform solution is dried and finally the chloroform is distilled off, whereby the hydrocortisone-21-dimorpholido-orthophosphate remains in the residue. It is purified by recrystallization from ethanol. $\lambda_{max}$=238 m$\mu$.

(b) 7.2 g. of hydrocortisone-21-dimorpholido-orthophosphate are dissolved in 55 ccm. of ethanol and then reacted with 60 ccm. of water. The solution is then percolated during the course of 2 hours through a column heated to 60° containing 25 ccm. of a sulphonic acid group-containing ion exchanger (for example, "ion exchanger I," a product of E. Merck AG), and flushed with 200 ccm. of the same solvent mixture in the course of 2 hours. The purified eluate is neutralized with N/5, sodium hydroxide to a pH of 6.7 and stripped of the solvent by evaporation under reduced pressure at 35°. The residue is dissolved in water and extracted with ethyl acetate. The aqueous phase is dried by evaporating the same under reduced pressure at 35°. The residue is dissolved in methanol and upon the addition of ether (diethyl ether) the hydrocortisone-21-orthophosphate is precipitated out. It is removed by suction filtration, washed with the ether and dried under reduced pressure at 100°. $\lambda_{max}$=239 m$\mu$.

Example II (a) 5 g. of prednisolone and 3.5 g. of dimorpholido-phosphoryl chloride are dissolved in 10 ccm. of absolute pyridine and allowed to stand for 6 days at room temperature. Finally, the reaction mixture is poured into 200 ccm. of water, the organic material extracted with chloroform, and the chloroform solution washed with water, 1% hydrochloric acid and then again with water. The chloroform solution is dried and finally the chloroform is distilled off. The residual prednisolone-21-dimorpholido-orthophosphate is boiled up with ethyl acetate and the insoluble fraction is recrystallized from alcohol. IR-bands at 1260, 1210 and 970 cm.$^{-1}$;

M.P. 244°. $\lambda_{max}$=244 m$\mu$, $E_{1cm.}^{1\%}$=251; $(\alpha)_D^{23}$:+96.5°

(b) 7.1 g. of prednisolone-21-dimorpholido-orthophosphate are dissolved in 55 ccm. of ethanol and then reacted with 50 ccm. of water. The solution is then percolated during the course of 2 hours through a column heated to 60° containing 25 ccm. of a sulphonic acid group-containing ion exchanger (as for example, the exchanger resin known under the trademark "Dowex 50") and flushed with 200 ccm. of the solvent mixture during the course of 2 hours. The purified eluate is neutralized with N/5-sodium hydroxide to a pH of 6.7 and stripped of the solvent under reduced pressure at 35°. The residue is dissolved in water and extracted with ethyl acetate. The aqueous phase is evaporated to dryness under reduced pressure at 35°. The residue is dissolved in methanol and upon addition of ether (diethyl ether) the monosodium salt of prednisolone-21-orthophosphate crystallizes out. It is sucked off, washed with the ether and after drying, recrystallized from acetone.

$\lambda_{max}$=244 m$\mu$. $E_{1cm.}^{1\%}$ 314, M.P. 200–201°. Di-sodium salt M.P. 250.5–251.5°

Example III (a) 5 g. of 16$\alpha$-methyl-9$\alpha$-fluoro-prednisolone and 3.5 g. of dimorpholido-phosphorylchloride are dissolved in 10 ccm. of absolute pyridine and allowed to stand for 5 days at room temperature. Finally the reaction mixture is poured into 200 ccm. of water, the organic material taken up in chloroform, and the chloroform solutions sequentially washed in water, 1% hydrochloric acid, and again with water. The chloroform solution is dried and finally the chloroform is distilled off, whereby the 16$\alpha$-methyl-9$\alpha$-fluoro - prednisolone-21-dimorpholido - orthophosphate remains as the residue. $\lambda_{max}$=238 m$\mu$. IR-bands at 1258, 1210 and 972 cm.$^{-1}$ (b) 7 g. of 16$\alpha$-methyl-9$\alpha$-fluoro-prednisolone-21-dimorpholido-orthophosphate are dissolved in 50 ccm. of ethanol and then reacted with 55 ccm. of water. The solution is percolated during the course of 2 hours through a column heated to 60° containing 25 ccm. of a sulphonic acid group containing ion exchanger (for example, "ion exchanger I," product of E. Merck AG) and flushed with 200 ccm. of the same solvent mixture during the course of 2 hours.

The purified eluate is neutralized with N/5-caustic soda to a pH of 6.7 and stripped of the solvent by evaporation under reduced pressure at 35°. The residue is dissolved in water. The obtained solution is acidified with dilute sulfuric acid and is extracted with n-butanol. The extract is washed with water, dried and evaporated to dryness under reduced pressure. The residue crystallizes upon triturating with acetonitril. Upon recrystallisation from methanol/acetonitril the pure 16$\alpha$-methyl-9$\alpha$-fluoro-prednisolone-21-orthophosphate is obtained.

M.P. 156°. $(\alpha)_D^{24}$:+88° (methanol); $\lambda_{max}$ 238–239 m$\mu$, $E_{1cm.}^{1\%}$ 315 (methanol)

By neutralization of this compound with equivalent amounts of sodium hydroxide in methanol the corresponding sodium salts are obtained. They are isolated by evaporating the solution to dryness, dissolving the residue in methanol and precipitating the sodium salt from such a solution with ether.

Monosodium salt:

M.P. 199–201°, $(\alpha)_D^{24}$:+87.5° (water), $\lambda_{max}$ 238–239 m$\mu$, $E_{1cm.}^{1\%}$ 308

Di-sodium salt:

M.P. 233–235°, $(\alpha)_D^{25}$:+56.5° (water), $\lambda_{max}$ 238–239 m$\mu$, $E_{1cm.}^{1\%}$ 270

Example IV (a) 6 g. of 16-methylene-prednisolone and 4 g. of dimorpholido-phosphoryl-chloride are dissolved in 10 ccm. of absolute pyridine and allowed to stand at room temperature for 5 days. Finally, the reaction mixture is poured into 250 ccm. of water, the organic material taken up in chloroform, and the chloroform solution washed with water, 1% hydrochloric acid and again with water. The chloroform solution is dried and finally the chloroform is distilled off. The 16-methylene-prednisolone-21-dimorpholido-orthophosphate remaining in the residue is boiled up with ethyl acetate and the insoluble fraction recrystallized from alcohol (ethanol). For purification, the crude product is chromatographed through florisil. The eluates obtained with chloroform and chloroform/ethyl acetate (1:1) are recrystallized from acetone.

M.P. 226°, $(\alpha)_D^{24}$: +16° (chloroform), $\lambda_{max}$ 242–244 m$\mu$, $E_{1cm}^{1\%}$ 264 (methanol)

IR-bands at 1260, 1225, 970 and 917 cm.$^{-1}$.

(b) 7.5 g. of 16-methylene-prednisolone-21-dimorpholido-orthophosphate are dissolved in 60 ccm. of ethanol and then reacted with 65 ccm. of water. The solution is percolated during the course of 2 hours through a column containing 25 ccm. of a sulphonic acid group-containing ion exchanger (for example, "ion exchanger I," product of E. Merck AG), heated to 60° and flushed with 200 ccm. of the solvent mixture during the course of 2 hours. The major portion of the alcohol is distilled off, then extracted with ethyl acetate, and the solvent medium removed from the organic phase. The residue is dissolved in methanol and neutralized with N/5-sodium hydroxide to a pH of 6.7. Finally, the solvent medium is distilled off under reduced pressure at 35°. The residue is dissolved in water and extracted with ethyl acetate. The aqueous phase is dried by evaporation under reduced pressure at 35°. The residue is dissolved in methanol and upon the addition of ether (diethyl ether), the monosodium salt of the 16-methylene-prednisolone-21-orthophosphate is precipitated, sucked off, and washed with the ether, and then dried under reduced pressure, and reprecipitated from acetone.

$\lambda_{max}$=242–244 m$\mu$. $E_{1cm}^{1\%}$+332 (methanol). M.P. 104–106°, $(\alpha)_D^{23}$: +17° (water)

(a) 3.2 g. of 16-methylene-9$\alpha$-fluoro-prednisolone and 2.2 g. of dimorpholido-phosphorylchloride in 10 ccm. of pyridine are heated in a bath at a temperature of 76° for 17 hours while excluding moisture. The reaction mixture is finally poured into 200 ccm. of water, decanted and washed several times with water. The residue is dissolved in ethanol, worked up with activated charcoal and filtered. The concentrated filtrate contains the 16-methylene - 9$\alpha$ - fluoro-prednisolone - 21 - dimorpholido-orthophosphate.

(b) 4 g. of methylene-9$\alpha$-fluoro-prednisolone-21-dimorpholido-orthophosphate are dissolved in 30 ccm. of ethanol and then reacted with 35 ccm. of water. The solution is percolated during the course of 1½ hours through a column heated to 60° containing 25 ccm. of a sulphonic acid group-containing ion exchanger (for example, the well known exchanger resin available under the trademark "Dowex 50") and flushed with 120 ccm. of the same solvent mixture during the course of 1½ hours. The purified eluate is neutralized with 5% sodium hydrogen carbonate solution to a pH of 6.7, and stripped of the solvent medium at 35°. The residue is dissolved in water and extracted with ethyl acetate. The aqueous phase is dried by evaporation under reduced pressure at 35°. The residue is dissolved in methanol and upon the addition of ether (diethyl ether) the monosodium salt of 16-methyl-9$\alpha$-fluoro-prednisolone precipitates out, is sucked off, washed with the ether and dried under reduced pressure at 100°.

$\lambda_{max}$=244 m$\mu$, $E_{1cm}^{1\%}$ 315

*Example VI*

(a) 5 g. of 16-methylene-9$\alpha$,6$\alpha$-difluoro-prednisolone and 3.5 g. dimorpholido-phosphorylchloride in 10 ccm. of absolute pyridine are heated for 17 hours on a bath having a temperature of 76°. Finally, the reaction mixture is poured into 200 ccm. of water, the organic material taken up in chloroform, and the chloroform solution washed with water, 1% hydrochloric acid and again with water. The chloroform solution is dried and finally the chloroform is distilled off. The 16-methylene-9$\alpha$,6$\alpha$-difluoro - prednisolone - 21 - dimorpholido - orthophosphate remaining in the residue is cooked up with ethyl acetate, and the insoluble fraction recrystallized from alcohol. $\lambda_{max}$=245 m$\mu$.

(b) 7.1 g. of 16-methylene-9$\alpha$,6$\alpha$-difluoro-prednisolone-21-dimorpholido-orthophosphate are dissolved in 55 ccm. of ethanol and then reacted with 60 ccm. of water. The solution is percolated during the course of 2 hours through a column heated to 60° containing 25 ccm. of a sulphonic acid group-containing ion exchanger ("ion exchanger I," product of E. Merck AG) and flushed with 200 ccm. of the same solvent mixture during the course of 2 hours. The major portion of the alcohol is distilled off, extracted with ethyl acetate and the solvent removed from the organic phase. The residue is dissolved in methanol and neutralized with N/5-sodium hydroxide to a pH of 6.7. Finally, the solvent is evaporated under reduced pressure to dryness. The residue is dissolved in methanol and upon the addition of ether (diethyl ether) the monosodium salt of the 16-methylene-9$\alpha$,6$\alpha$-difluoro-prednisolone-21-orthophosphate crystallizes out, is sucked off, washed with water and after drying under reduced pressure, recrystallized from acetone. $\lambda_{max}$=244 m$\mu$.

*Example VII*

(a) 5 g. of 6-fluoro-6-dehydro-prednisolone and 3.4 g. of dimorpholido-phosphorylchloride are dissolved in 10 ccm. of absolute pyridine and allowed to stand at room temperature for 6 days. Finally, the reaction mixture is poured into 200 ccm. of water, the organic material taken up in chloroform and the chloroform solution washed with water, 1% hydrochloric acid and then again with water. The chloroform solution is dried, and finally, the chloroform is distilled off whereby the 6-fluoro-6-dehydro - prednisolone - 21 - dimorpholido - orthophosphate remains in the residue. It is boiled up with ethyl acetate and the insoluble portion recrystallized from alcohol (ethanol). $\lambda_{max}$=244; 255; 296 m$\mu$.

(b) 7 g. of 6-fluoro-6-dehydro-prednisolone-21-dimorpholido-orthophosphate are dissolved in 55 ccm. of ethanol and then reacted with 60 ccm. of water. The solution is percolated during the course of 2 hours through a column heated to 60° containing 25 ccm. of a sulphonic acid group containing ion exchanger (for example, "ion exchanger I," product of E. Merck AG) and flushed with 200 ccm. of the solvent mixture during the course of 2 hours. The major portion of the alcohol is distilled off, extracted with ethyl acetate and the solvent medium removed from the organic phase. The residue is dissolved in methanol and neutralized with a 5% solution of sodium hydrogen carbonate to a pH of 6.7. Finally, the solvent medium is distilled off under reduced pressure at 35°. The residue is dissolved in water and extracted with chloroform. The aqueous phase is concentrated under reduced pressure at 35°. The residue is dissolved in methanol and on the addition of ether (diethyl ether), the monosodium salt of 6-fluoro-6-dehydro-prednisolone-21-orthophosphate precipitates out, sucked off, washed with the ether and after drying purified and recrystallized from acetone. $\lambda_{max}$=225, 255, 297 m$\mu$.

*Example VIII*

(a) 30 g. of pregnane-3,20-dione-21-ol with 120 ccm. of absolute pyridine and 25.3 g. of phosphoryldimorpholido-chloride are allowed to stand for 5 days at room temperature in a stoppered container. The reaction mass is stirred, while cooling with ice, into a mixture of 75 g. of sulphonic acid and 300 ccm. of water and worked up by extraction with chloroform in customary or conventional fashion. The raw product is purified chromatographically with 1 kg. of florisil, and the pure pregnane-3,20-dione-21-ol-21-dimorpholido-phosphate is eluated with benzene/chloroform mixture and with chloroform. The pure product excels by characteristic IR-bands at 1260, 1227 and 975 cm.$^{-1}$, while the hydroxyl absorption vanishes.

(b) 29.3 g. of pregnane-3,20-dione-21-ol-21-dimorpholido-phosphate were dissolved in 165 ccm. of alcohol (ethanol)/water 2:3 and reacted with 1 kg. of a sulphonic acid group-containing ion exchanger (for example, Amberlite IR-120) and stirred for 40 hours at room temperature. A column was filled with the mass and eluated with alcohol (ethanol)/water 2:3. The eluate was neutralized with dilute caustic soda and for purification washed with chloroform. The aqueous phase was reacted with 10 volume-percent methanol and filtered through a weakly basic ion exchanger (for example, Amberlite IR-45) whereby it was washed with methanol/water of equal volume content. The eluate was filtered directly through an acid ion exchanger (for example, Amberlite IR-120), washed so long as the eluate exhibited an acid reaction. The pregnane-3,20-dione-21-ol-21-orthophosphate comes from the column as a milky suspension and crystallizes out therefrom. The substance is filtered off and the mother liquid is concentrated under reduced pressure at 35–45°, whereby the substance is almost completely recovered or obtained in crystalline form. The dried phosphate is recrystallized by dissolution in a small quantity of acetone, to which some ether enriched with petroleum ether is added, and allowed to stand. The pure acid phosphate is obtained in the form of colorless needles having a melting point of 137° $(\alpha)_D^{26}$: +96° (chloroform). The thus obtained pregnane-3,20-dione-21-ol-21-orthophosphate, by neutralization with equivalent quantities of sodium hydroxide in methanol solution, allows for the preparation of the corresponding sodium salts. They are isolated by concentrating the solution to dryness under reduced pressure at 35°.

The monosodium salt is taken up in dimethylformamide and precipitated with ether (diethyl ether): M.P. 156–157° (decomposition): $(\alpha)_D^{27}$: +96° (water).

The disodium salt is triturated with acetone and filtered off. M.P. 206–208° (decomposition): $(\alpha)_D^{25}$: +76° (water).

Example IX (a) 30 g. of pregnane-3,20-dione-21-ol are allowed to stand with 120 ccm. of absolute pyridine and 16.9 g. of phosphoryl-bis-(dimethylamido)-chloride for 5 days at room temperature. The reaction mixture is poured while cooling with ice into a mixture of 75 g. of concentrated sulfuric acid and 300 ccm. of water and worked up in usual manner by extraction with chloroform. The crude product is purified chromatographically by passing it through florisil. The pure pregnane-3,20-dione-21-ol-21-bis-(dimethylamido)-phosphate is eluated with a mixture of benzene/chloroform (1:1) and with chloroform. The product shows characteristic IR-bands at 1235 and 995 cm.$^{-1}$.

(b) 7 g. of pregnane-3,20-dione-21-ol-21-bis-(dimethylamido)-phosphate are dissolved in 50 ccm. of ethanol. After addition of 50 ccm. of water the solution is stirred at 60° for 24 hours with 20 ccm. of anion exchanger resin containing sulfonic acid groups (as, for example, the exchanger resin known under the trademark "Dowex 50"). Then the solution is percolated within two hours through a column heated to 60°. The product is eluated with 200 ccm. of the same solvent mixture within 2 hours. The combined eluates are neutralized with N/5-sodium hydroxide to a pH of 6.7. The solvent is evaporated under reduced pressure at 35°. The residue is dissolved in water and extracted with ethyl acetate. The aqueous layer is evaporated to dryness at 35° under reduced pressure. The residue is dissolved in methanol. Upon addition of ether the monosodium salt of pregnane-3,20-dione-21-orthophosphate crystallizes out which is filtered off, washed with ether and recrystallized from acetone. M.P. 156–157° (decomposition).

Example X (a) In an analogous manner to the method described in Example 8a, the prednisolone-21-distearylamido-orthophosphate is obtained by reaction of prednisolone with distearylamido-phosphoryl-chloride. Characteristic IR-bands at 1260 and 980 cm.$^{-1}$.

(b) By the method analogous to that of Example 2b, the prednisolone-21-di-stearylamido-orthophosphate is converted into the monosodium salt of prednisolone-21-orthophosphate. M.P. 200–201°.

Example XI (a) In analogy to Example 2a, the prednisolone-21-dimorpholido-orthophosphate is prepared. M.P. 244°.

(b) 5 g. of prednisolone-21-dimorpholido-orthophosphate are dissolved in 35 ccm. of a mixture of ethanol/water (3:2). 10 ccm. of sulfuric acid (10%) are added and the solution is allowed to stand for 20 hours at 60°. The reaction mixture is worked up in the usual way (cf. for instance, Example 2b) whereby the monosodium salt of prednisolone 21-orthophosphate is obtained. M.P. 200–201°. The same results are obtained when using hydrochloric acid instead of sulfuric acid.

Example XII (a) According to the method described in Example 8a, 16-methylene-prednisolone is reacted with bis-(dibenzylamido)-phosphoryl chloride thereby to form the 16 - methylene - prednisolone - 21 - bis - (dibenzylamido)-orthophosphate which has characteristic IR-bands at 1260 and 975 cm.$^{-1}$.

(b) In analogy to Example 2b, 16-methylene-prednisolone-21-bis-(dibenzylamido)-orthophosphate is converted into the monosodium salt of 16-methylene-prednisolone-21-orthophosphate. M.P. 105–106°.

Example XIII

According to the method described in Example 12, the 6 - fluoro - 6 - dehydro - prednisolone - 21 - di - paratolylamido-orthophosphate is obtained which has characteristic IR-bands at 1255 and 975 cm.$^{-1}$ and is converted into the monosodium salt of 6-fluoro-6-dehydro-prednisolone-21-orthophosphate.

Example XIV (a) According to the method described in Example 1a, hydrocortisone is reacted with di-piperidido-phosphoryl chloride to form hydrocortisone-21-di-piperidido-orthophosphate. IR-bands at 1265 and 975 cm.$^{-1}$.

(b) According to the method described in Example 1b, hydrocortisone-21-di-piperidido-orthophosphate is converted into the monosodium salt of hydrocortisone-21-orthophosphate. $\lambda_{max}$ 238 m$\mu$.

We claim:
1. In a method of preparing 21-orthophosphates of steroids of the pregnane series having the formula

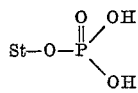

wherein:

St designates a steroid radical of the pregnane series having a free valence in the 21-position, the step of which comprises reacting a steroid diamido-orthophosphate of the formula

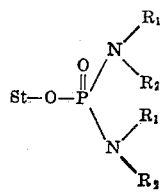

wherein:

$R_1$ and $R_2$ designate a member of the group consisting of hydrogen, an alkyl radical containing 1 to 20 carbon atoms, an aryl radical containing 6 to 8 carbon atoms, and an aralkyl radical containing 7 to 9 carbon atoms, and when linked together form, with the nitrogen atom a member of the group consisting of the morpholino and the piperidino radical, and wherein St has the significance above defined with an acidic agent selected from the group consisting of a strong acid and an acid ion exchange resin, thereby to form the corresponding steroid-21-orthophosphate.

2. Method in accordance with claim 1, wherein the steroid diamido-orthophosphate is a steroid-21-dimorpholido-orthophosphate.

3. Method in accordance with claim 1, wherein the steroid diamido-orthophosphate is a steroid-21-dimorpholido-orthophosphate and the acidic agent is an acid ion exchange resin.

4. Method in accordance with claim 1, wherein the steroid-21-diamido-orthophosphate is prednisolone-21-dimorpholido-orthophosphate.

5. Method in accordance with claim 1, wherein the steriod-21-diamido-orthophosphate is 16-methylene-prednisolone-21-dimorpholido-orthophosphate.

6. Method in accordance with claim 1, wherein the steroid-21-diamido-orthophosphate is 16-methylene-9α-fluoro-prednisolone-21-dimorpholido-orthophosphate.

7. Method in accordance with claim 1, wherein the steroid-21-diamido-orthophosphate is 6-fluoro-6-dehydro-prednisolone-21-dimorpholido-orthophosphate.

8. Method in accordance with claim 1 including the step of reacting the steroid-21-orthophosphate with a member of the group consisting of alkali metal hydroxides, alkali metal carbonates, alkali metal bicarbonates and the corresponding ammonium compounds, to form the corresponding water soluble salt.

9. Method in accordance with claim 8 wherein the steroid-21-orthophosphate is reacted with sodium hydroxide, to form a member of the group consisting of the mono- and the disodium salt.

10. A steroid-21-orthophosphate of the following Formula I:

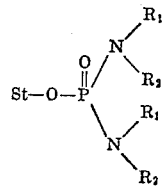

wherein:

$R_1$ and $R_2$ designate a member of the group consisting of hydrogen, an alkyl radical containing 1 to 20 carbon atoms, an aryl radical containing 6 to 8 carbon atoms, and an aralkyl radical containing 7 to 9 carbon atoms, and when linked together form, with the nitrogen atom, a member of the group consisting of the morpholino and the piperidino radicals, wherein St is the 21-deshydroxy residue of a member of the group consisting of:
hydrocortisone
prednisolone
16-methyl-9α-fluoro-prednisolone
16-methylene-prednisolone
16-methylene-9α-fluoro-prednisolone
16-methylene-6,9α-difluoro-prednisolone
6-fluoro-6-dehydro-prednisolone and
pregnane-3,20-dione-21-ol.

11. A diarylamido orthophosphate in accordance with Formula I as defined in claim 10.

12. A steroid-21-bis-(alkylamido)-orthophosphate in accordance with Formula I as defined in claim 10.

13. A steroid - 21 - dimorpholido - orthophosphate in accordance with Formula I as defined in claim 10.

14. A steroid - 21 - dipiperidino - orthophosphate in accordance with Formula I as defined in claim 10.

References Cited in the file of this patent
UNITED STATES PATENTS

| | | |
|---|---|---|
| 2,939,873 | Chemerda et al. | June 7, 1960 |
| 2,949,453 | Sarett | Aug. 16, 1960 |
| 2,950,298 | Elks et al. | Aug. 23, 1960 |
| 2,967,179 | Arkley et al. | Jan. 3, 1961 |